(12) United States Patent
Arinaga et al.

(10) Patent No.: US 7,107,950 B2
(45) Date of Patent: Sep. 19, 2006

(54) VARIABLE VALVE ACTUATING MECHANISM FOR INTERNAL COMBUSTION ENGINE

(75) Inventors: Tsuyoshi Arinaga, Kanagawa (JP); Takanobu Sugiyama, Yokohama (JP); Mitsuo Gunji, Kanagawa (JP); Shin Ishizaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/001,021

(22) Filed: Dec. 2, 2004

(65) Prior Publication Data

US 2005/0120988 A1 Jun. 9, 2005

(30) Foreign Application Priority Data

Dec. 9, 2003 (JP) ............................. 2003-409753

(51) Int. Cl.
*F01L 1/34* (2006.01)

(52) U.S. Cl. ............................ 123/90.16; 123/90.15; 123/90.19; 123/90.33; 123/90.34; 464/7; 464/17; 464/183; 384/397; 384/400; 184/6.22

(58) Field of Classification Search ........... 123/90.16, 123/90.19, 90.33
See application file for complete search history.

(56) References Cited

U.S. PATENT DOCUMENTS

| 5,220,891 A | * | 6/1993 | Nakamura et al. ........ 123/90.16 |
| 5,904,226 A | * | 5/1999 | Sakaguchi et al. ............ 184/67 |
| 5,913,292 A | * | 6/1999 | Takemura et al. ........ 123/90.17 |
| 6,029,618 A | * | 2/2000 | Hara et al. ................ 123/90.16 |
| 6,374,950 B1 | * | 4/2002 | Takeno ........................ 184/7.4 |

FOREIGN PATENT DOCUMENTS

| EP | 1 234 958 A2 | 8/2002 |
| JP | 11-107725 A | 4/1999 |
| JP | 2000-291417 A | 10/2000 |
| JP | 2002-256905 A | 9/2002 |

* cited by examiner

*Primary Examiner*—Thomas Denion
*Assistant Examiner*—Kyle M. Riddle
(74) *Attorney, Agent, or Firm*—Foley & Lardner LLP

(57) ABSTRACT

A lift and operating angle varying mechanism is arranged to vary an intake valve operation angle and an intake valve lift of the engine continuously by rotating a control shaft with an actuator disposed at an end of the control shaft which is rotatably supported by a plurality of bearings. A lubricating oil is supplied to the bearings so as to reduce nonuniformity in temperature distribution of the control shaft in the longitudinal direction.

19 Claims, 6 Drawing Sheets

VARIABLE VALVE ACTUATING MECHANISM FOR INTERNAL COMBUSTION ENGINE

BACKGROUND OF THE INVENTION

The present invention relates to a variable valve actuating mechanism for an internal combustion engine.

Japanese Patent Application Publication No. 2002-256905 (EP 1 234 958 A2) shows an intake control apparatus for an internal combustion engine equipped with a lift and operating angle varying mechanism capable of varying an intake valve operation angle and an intake valve lift quantity simultaneously and continuously. This apparatus reduces pumping loss, and controls an intake air quantity independently of a throttle valve.

When the intake valve lift quantity varies from cylinder to cylinder of an engine because of dimensional tolerance of parts and component assemblage, the intake air quantity varies from cylinder to cylinder, and hence the output torque of the engine fluctuates. In such a state, the engine generates unpleasant vibrations and noises to a level badly affecting the quality of idling operation in which the demand for stability and silence is specifically high. As the variation in intake valve lift quantity is in the order of a few micrometers (μm)~ a few hundreds micrometers (μm), the variation is not problematical in effect in a conventional internal combustion engine arranged to control the intake air quantity with a fixed cam and a throttle valve.

The apparatus disclosed in the above-mentioned patent document is arranged to contain the variation in the intake valve lift quantity among the cylinders within a predetermined range.

SUMMARY OF THE INVENTION

In this apparatus, however, the intake air quantity is controlled without resort to a throttle valve, and therefore, the valve lift quantity becomes very small in a very low load operation such as idling, so that the idling performance can be adversely affected from engine start to sufficient warm-up.

It has been found out by the inventors of the present application as a result of measurement of an inline engine as an example that there is temperature unevenness in a control shaft of a lift and operating angle varying mechanism, in the longitudinal direction of the control shaft, and this temperature unevenness in the control shaft causes the unevenness in the valve lift among the cylinders.

This temperature unevenness causes uneven thermal expansion in the longitudinal direction of the control shaft, and thereby causes variation in the intake valve lift quantity among the cylinders, resulting in undesired variation in torque produced by the internal combustion engine.

It is, therefore, an object of the present invention to provide a lift and operating angle varying mechanism to reduce temperature nonuniformity in the longitudinal direction, of the control shaft arranged to rotate to vary valve lift and/or valve operation angle.

According to one aspect of the present invention, a variable valve actuating apparatus for an internal combustion engine comprises: a lift and operating angle varying mechanism which includes a control shaft extending in a longitudinal direction from a first end to a second end along a cylinder row of the engine, and which is arranged to vary an intake valve operation angle and an intake valve lift of the engine continuously by rotating the control shaft; an actuator disposed at the second end of the control shaft, and rotating the control shaft; and a plurality of bearings supporting rotatably the control shaft. The control shaft is a hollow shaft including a hollow section extending inside the control shaft in the longitudinal direction of the control shaft, and the hollow section is adapted to receive supply of lubricating oil to lubricate the bearings.

According to another aspect of the invention, a variable valve actuating apparatus comprises: a lift and operating angle varying mechanism which includes a control shaft extending from a first end to a second end in a longitudinal direction along a cylinder row of the engine, and which is arranged to vary an intake valve operation angle and an intake valve lift of the engine continuously by rotating the control shaft; an actuator disposed at the second end of the control shaft, and rotating the control shaft; a plurality of bearings supporting rotatably the control shaft; and a lubricating oil supply device or mechanism to supply a lubricating oil to the bearings by discharging the lubricating oil onto an outer surface of the control shaft.

According to still another aspect of the invention, a variable valve actuating apparatus comprises: a lift and operating angle varying mechanism which includes a control shaft extending in a longitudinal direction from a first end to a second end along a cylinder row of the engine, and which is arranged to vary an intake valve operation angle and an intake valve lift of the engine continuously by rotating the control shaft; a plurality of bearings supporting rotatably the control shaft; and means for supplying a lubricating oil to the bearings so as to reduce nonuniformity in temperature distribution of the control shaft in the longitudinal direction. The lubricating supplying means may include at least one of means (such as one or more holes formed in the control shaft and an oil hole formed in at least one of the shaft bearings) for supplying the lubricating oil to the bearings through an inside hollow section formed in the control shaft; and means (such as external piping to spray or drop the lubricating oil onto the control shaft) for supplying the lubricating oil onto the outer surface of the control shaft.

DETAILED DESCRIPTION OF THE INVENTION

FIGS. 1–4 show a variable valve actuating system or apparatus according to a first embodiment of the present invention. In this embodiment, the invention is applied to an inline four-cylinder engine. However, the present invention is also applicable to an internal combustion engine with other cylinder arrangement such as a V-type engine, and a six-cylinder or other multi-cylinder engine.

Figure 1:
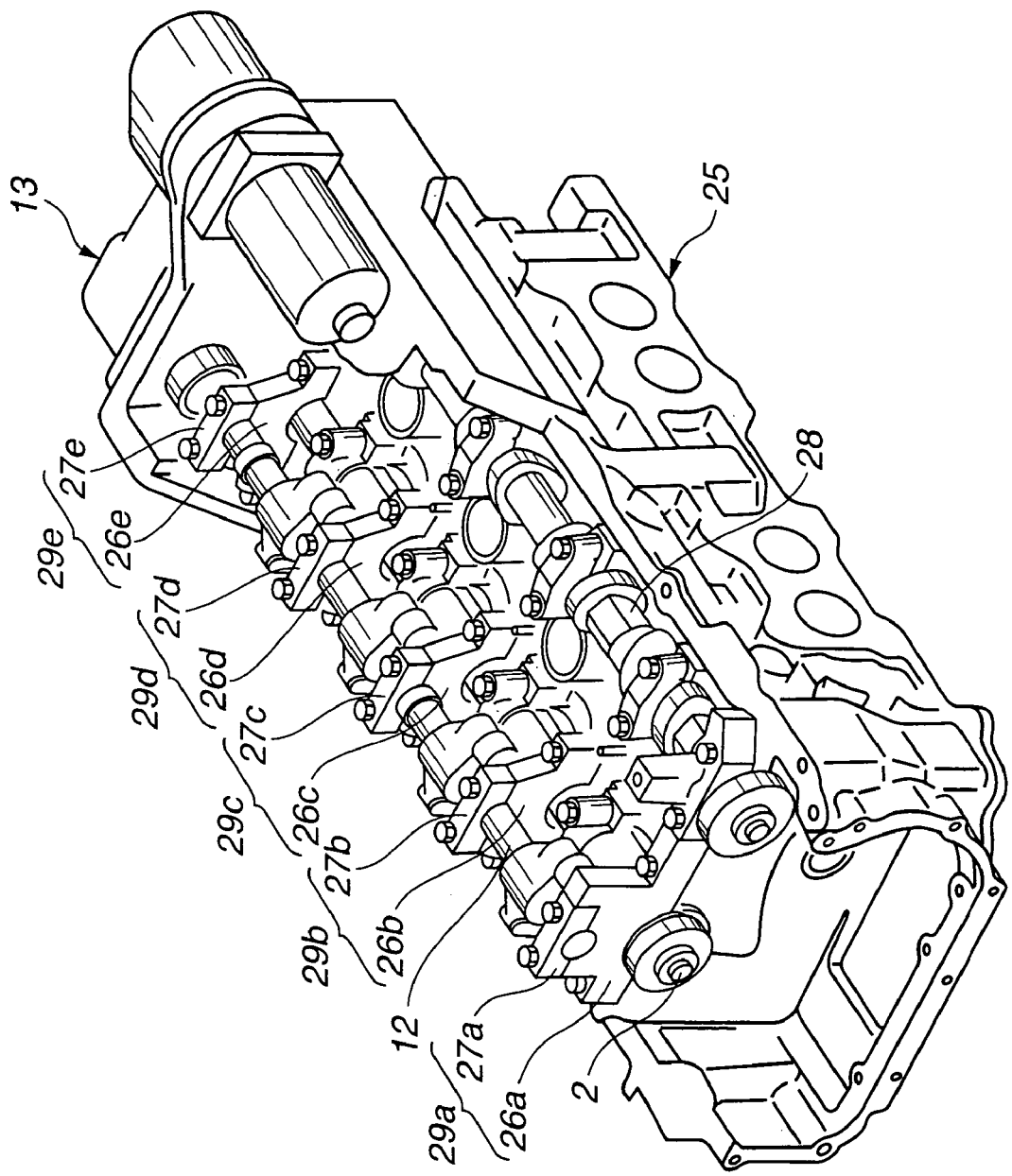
FIG. 1 is a schematic view showing an internal combustion engine provided with a variable valve actuating system or apparatus according to a first embodiment of the present invention.
Figure 2:
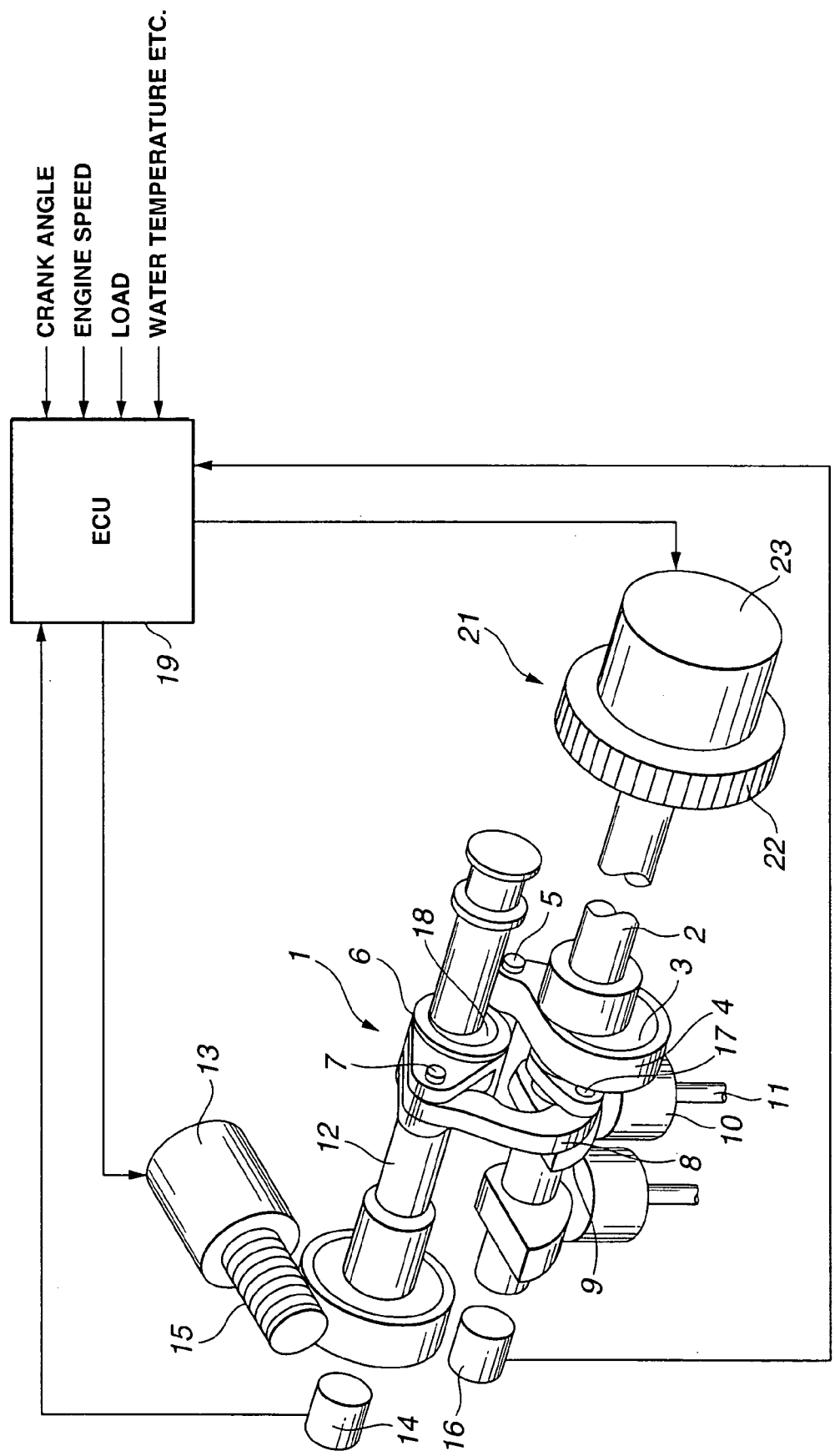
FIG. 2 is a schematic view showing a valve lift and operating angle varying mechanism of the valve actuating apparatus according to the first embodiment (and the other embodiments).

The variable valve actuating system, shown in FIGS. 1 and 2, for varying a valve lift characteristic of intake valves continuously includes, in combination, a lift and operation angle varying or control mechanism 1 capable of varying a intake valve lift quantity and an intake valve operation angle, and a phase varying or control mechanism 21 for advancing or retarding a center phase (phase with respect to crank angle (not shown)). In this example, an exhaust cam 28 is an ordinary direct drive type cam (with fixed lift and operation angle, and fixed lift center phase) to open and close an exhaust valve. However, it is optional to employ a variable valve actuating system similar to the mechanism shown in FIG. 2, on the exhaust side, too.

The lift and operation angle varying mechanism 1 is known per se, as disclosed in Japanese Patent Application Publication No. H11(1999)-107725.

Lift and operation angle varying mechanism 1 shown in FIG. 2 includes an intake valve 11 slidably mounted in a cylinder head 25; a drive shaft 2 (intake cam shaft) rotatably supported by cylinder head 25 and cam brackets 26 located on an upper portion of cylinder head 25; an eccentric cam 3 fixedly mounted on drive shaft 2 by press fit; a hollow control shaft 12 which is rotatably supported, above drive shaft 2, by bearings 29 each composed of one of the cam brackets 26 and one of cam bracket caps 27, and which extends longitudinally in parallel to drive shaft 2; a rocker lever 6 swingably supported on an eccentric cam 18 of control shaft 12; and a rocker cam 9 abutting on a tappet 10 attached to an upper portion of each intake valve 11. A link arm 4 connects eccentric cam 3 and rocker lever 6. A link member 8 connects rocker lever 6 and rocker cam 9.

As shown in FIG. 1, control shaft 12 of this example is supported by five of the bearings 29a, 29b, 29c, 29d and 29e arranged in a line in a longitudinal direction of control shaft 12 from a first shaft end of the control shaft to a second shaft end to which an actuator 13 is connected. First bearing 29a supporting control shaft 12 near the first shaft end is remotest from actuator 13. Fifth bearing 29e is closest to the second shaft end of control shaft 12, and hence closest to actuator 13. Second, third and fourth bearings 29b, 29c and 29d are positioned to support intermediate portions of control shaft 12 between the first and fifth bearing 29a and 29e.

Drive shaft 2 is driven by the crank shaft of the engine through a timing chain or a timing belt.

Eccentric cam 3 has a circular outer surface whose center is off the center axis of drive shaft 2 by predetermined amount. A ring portion of link arm 4 is rotatably fit over the circular outer surface of eccentric cam 3.

An intermediate portion of rocker lever 6 is swingably mounted on eccentric cam 18 of control shaft 12. One end of rocker lever 6 is connected with an arm end of link arm 4 by a connecting pin 5, and the other end of rocker lever 6 is connected with an upper end of link member 8 by a connecting pin 7. The center of eccentric cam 18 is off the center axis of control shaft 12. Accordingly, the center of swing motion of rocker lever 6 shifts in accordance with the angular position of control shaft 12.

Rocker cam 9 is rotatably mounted on drive shaft 2. Rocker cam 9 includes an end portion which projects sideways and which is connected with a lower end portion of link member 8 by connecting pin 17. Rocker cam 9 includes a base circle surface so curved as to describe a circular arc concentric with drive shaft 2, and a cam surface extending continuously from the base circle surface in a curved line. The base circle surface and the cam surface contact with the upper surface of tappet 10 in accordance with the swing position of rocker cam 9.

That is, the base circle surface defines a base circle period during which the valve lift is held equal to zero. When rocker cam 9 swings and the cam surface comes into contact with tappet 10, then the intake valve lifts gradually. There is provided a short ramp period between the base circle period and the lift period.

As shown in FIGS. 1 and 2, control shaft 12 is rotated within a predetermined angle range by the lift and operating angle control actuator 13 provided at the second shaft end of control shaft 12. This lift and operating angle control actuator 13 includes a servomotor for driving control shaft 12 through a worm gear 15, and is controlled by a control signal from an engine control unit 19. A control shaft sensor 14 senses the rotation angle of control shaft 12.

The lift and operating angle varying mechanism 1 is operated as follows. When drive shaft 2 rotates, eccentric cam 3 causes link arm 4 to move up and down, and rocker lever 6 swings. This swing motion of rocker lever 6 is transmitted to rocker cam 9 through link member 8, and rocker cam 9 swings. By the cam action of rocker cam 9, rocker cam 9 pushes down tappet 10, and thereby lifts intake valve 11.

By varying the rotation angle of control shaft 12, actuator 13 can shift the initial position of rocker lever 6, and hence the initial swing position of rocker cam 9.

When, for example, eccentric cam 18 is located at an upper position as viewed in FIG. 2, rocker lever 6 as a whole is located at an upper position in FIG. 2, and the link member 8 pulls the end of rocker cam 9 relatively upwards with connecting pin 17. That is, the initial position of rocker cam 9 inclines in such a direction that the cam surface of rocker cam 9 moves apart from tappet 10. Accordingly, when rocker cam 9 swings in accordance with the rotation of drive shaft 2, the base circle surface is held in contact with tappet 10 for a comparatively long time period, and the cam surface is held in contact with tappet 10 for a shorter time period. In this state, therefore, the lift and operating angle varying mechanism 1 decreases the valve lift, and decreases the operation angle between the valve opening timing and the valve closing timing.

Conversely, when eccentric cam 18 is located at a lower position in FIG. 2, rocker lever 6 as a whole is located at a lower position in FIG. 2, the end of rocker cam 9 is relatively pushed downwards by connecting pin 17. That is, the initial position of rocker cam 9 inclines in such a direction that the cam surface of rocker cam 9 moves toward tappet 10.

Accordingly, when rocker cam 9 swings in accordance with the rotation of drive shaft 2, the contact point with tappet 9 moves immediately from the base circle surface to the cam surface. Therefore, the valve lift becomes larger, and the operation angle between the valve opening timing and valve closing timing is increased.

The initial position of eccentric cam 18 is shifted continuously, and thereby the valve lift characteristic is varied continuously. That is, this lift and operating angle varying mechanism 1 can increase and decrease the lift quantity and the operation angle continuously at the same time. The intake valve opening timing and valve closing timing vary approximately in a symmetrical manner in accordance with the intake valve lift quantity and operation angle though the characteristic is influenced by the layout of various parts.

As shown in FIG. 2, the phase control mechanism 21 includes sprocket 22 provided at the front end of drive shaft 2, and a phase control actuator 23 arranged to rotate sprocket 22 and drive shaft 2 relative to each other within a predetermined angle range. Sprocket 22 is driven by the crankshaft through a timing chain or timing belt (not shown). Actuator 23 is a hydraulic rotational actuator or an electromagnetically driven (controlled) rotational actuator, and is controlled by control signal from engine control unit 19. Actuator 23 rotates sprocket 22 and drive shaft 2 relatively, and thereby advances or retards the lift center phase continuously so that the lift characteristic is shifted in the advance or retard direction with the form of the lift characteristic being held unchanged. The control state of phase control mechanism 21 is sensed by drive shaft sensor 16 responsive to the rotational position of drive shaft 2.

Each of lift and operation angle varying mechanism 1 and variable phase control mechanism 21 can be controlled by a closed loop control system based on the detection by sensor 14 or 16, or alternatively by an open loop control system based on one or more engine operating conditions such as the crank angle, engine speed, engine load and engine cooling water temperature sensed by respective sensors.

The thus-constructed variable valve actuating system provided on the intake side of an internal combustion engine can control the intake air quantity by controlling the intake valves irrespective of a throttle valve. In a practical engine, the existence of slight vacuum is desired in an intake system for the purpose of recirculation of blow-by gases. For this reason, in place of a throttle valve, it is desirable to provide a throttling mechanism or a flow-constricting mechanism in an upstream portion of an air intake passage to create a vacuum.

Figure 3:
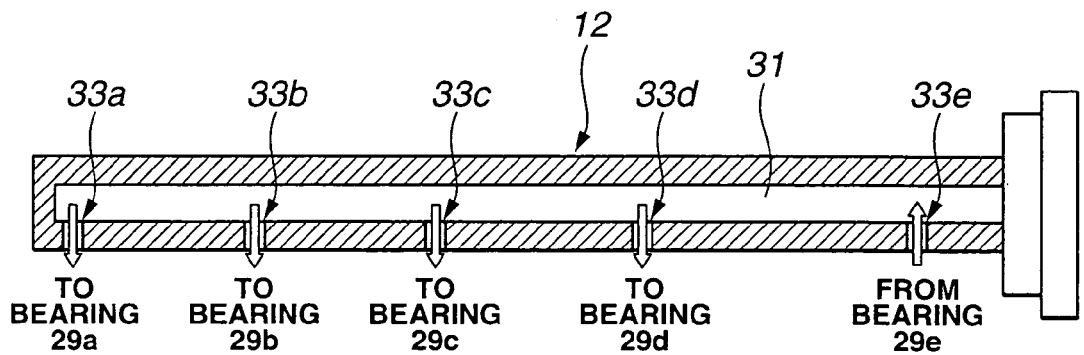
FIG. 3 is a longitudinal sectional view showing a control shaft of the lift and operating angle varying mechanism according to the first embodiment.

FIG. 3 schematically shows the inside of control shaft 12 in a longitudinal section. Arrows in FIG. 3 show flow directions of lubricating oil. As mentioned above, control shaft 12 is a hollow shaft, and includes a hollow section 31 extending inside control shaft 12 in the longitudinal direction of control shaft 12. Both ends of control shaft 12 are closed. Hollow section 31 is adapted to receive the supply of the lubricating oil to lubricate sliding parts between control shaft 12 and bearings 29. In the example of FIG. 3, the lubricating oil is supplied into hollow section 31 through a radial hole 33e from bearing 29e nearest to the lift and operating angle control actuator 13 provided at the second end of control shaft 12, that is, the right end of control shaft 12 as viewed in FIG. 3.

Radial holes 33 (33a~33e) are formed in control shaft 12. Each hole 33 extends radially from hollow section 31 to an open end opened in the outer or outside surface of control shaft 12 toward a unique one of bearings 29. Five holes 33a, 33b, 33c, 33d and 33e are arranged in a row in this order in the longitudinal direction of control shaft 12 from the first end (on the left side in FIG. 3) to the second end (on the right side in FIG. 3) to which actuator 13 is connected, in the manner corresponding to the row of five bearings 29a, 29b, 29c, 29d and 29e. First hole 33a is formed at a position remotest from actuator 13, to supply the lubricating oil to the remotest first bearing 29a. Second, third (or middle) and fourth holes 33b, 33c and 33d are formed, respectively, at second remotest, third remotes and fourth remotest positions, to lubricate the second, third and fourth bearings 29b, 29c and 29d. Fifth hole 33e is formed at a position closest to actuator 13, and arranged to receive the lubricating oil flowing from fifth bearing 29e into hollow section 31. As mentioned before, each bearing 29 is composed of cam bracket 26 (26a, 26b, 26c, 26d or 26e) and cap 27 (27a, 27b, 27c, 27d or 27e) between which control shaft 12 is rotatably clamped.

Figure 4:
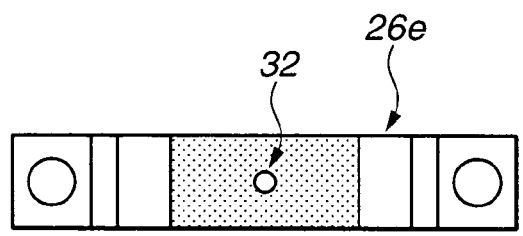
FIG. 4 is a plan view showing a cam bracket of one of bearings according to the first embodiment.

Fifth bearing 29e is an inlet side bearing arranged to supply the lubricating oil into hollow section 31 whereas each of the other bearings 29a, 29b, 29c and 29d is an outlet side bearing arranged to receive the lubricating oil from hollow section 31 of control shaft 12. As shown in FIG. 4, the cam bracket 26e of fifth bearing 29e is formed with an oil hole 32 communicating with a main gallery (not shown) inside the internal combustion engine. Oil hole 32 is opened in a sliding portion in sliding contact with control shaft 12 as shown by shading in FIG. 4. The lubricating oil gushing from oil hole 32 lubricates the sliding part between bearing 29e and control shaft 12, and flows into hollow section 31 through hole 33e formed in control shaft 12. Then, the lubricating oil flows out from hollow section 31 through holes 33a~33d, to the sliding parts between bearings 29a~29d and control shaft 12. Thus, the lubricating oil is supplied into hollow section 31 through at least one of holes 33a~33e from at least one of bearings 29, and is supplied from hollow section 31 to the remaining bearings 29 through the remaining holes 33.

Bearings 29a~29d are outlet side bearings to receive the lubricating oil from hollow section 31 in the example shown in FIG. 3. Cam bracket 26a, 26b, 26c or 26d of each of the outlet side bearings 29a~29d is formed with no oil hole 32. Unlike fifth bearing 29e as the inlet side bearing, each outlet side bearing is not designed to supply the lubricating oil into hollow section.

In the arrangement according to the first embodiment, the lubricating oil of relatively high temperature (having a larger quantity of heat) is supplied into a second end portion at or near the second end of hollow section 31 nearest to actuator 13, so that the temperature unevenness or nonuniformity in the longitudinal direction of control shaft 12 is abated.

Figure 5:
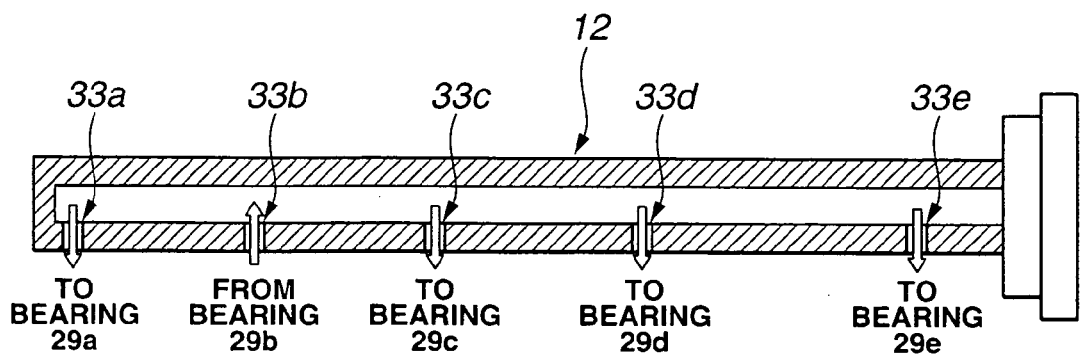
FIG. 5 is a longitudinal sectional view showing a control shaft as a comparative example for illustrating operations in the first embodiment.

The variable valve actuating system according to the first embodiment can provide effects as explained below in comparison with a comparative example shown in FIG. 5. The comparative example of FIG. 5 is substantially identical to the structure of FIG. 3 in most aspects as suggested by the use of the same reference numerals. Arrows in FIG. 5 show flow directions of the lubricating oil. In this comparative example, the lubricating oil is supplied into hollow section 31 through second bearing 29b, and then lubricating oil flows from hollow section 31 to the sliding parts between bearings 29a and 29c~29e and control shaft 12.

In this comparative example, temperature distribution in the longitudinal direction of control shaft 12 was measured, by the inventors of the present application, with a thermocouple of wire from a start of an engine to an end of warming-up. In practice, surface temperature of each of cam brackets 26a–26e (shown in FIG. 1) was measured during engine operation since control shaft 12 was rotated during engine operation.

Figure 6:
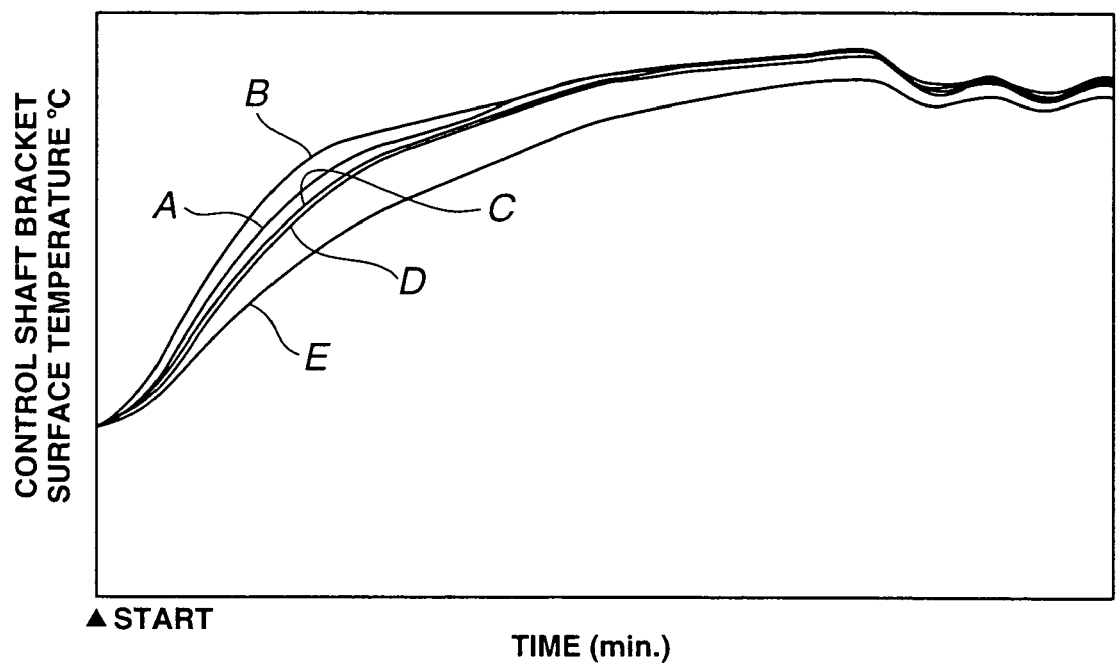
FIG. 6 is a characteristic diagram showing the result of temperature measurement of each cam bracket from an engine start to an end of warm-up in the comparative example.

FIG. 6 shows the results of measurement of surface temperatures of cam bracket 26a–26e in the comparative example. A characteristic line A in FIG. 6 shows the surface temperature of cam bracket 26a. Characteristic lines B, C, D and E show the surface temperatures of cam bracket 26b, cam bracket 26c, cam bracket 26d, and cam bracket 26e, respectively.

As evident from FIG. 6, during warming-up, the temperature of cam bracket 26b of bearing 29b supplying lubricating oil into hollow section 31 becomes highest, and the temperature of cam bracket 26e of bearing 29e nearest to actuator 13 is lowest. As the lubricating oil flows in the longitudinal direction of control shaft 12, the temperature of the lubricating oil becomes lower. Therefore, the temperature of cam bracket 26e farthest away from cam bracket 26b becomes lowest. The temperature difference between the cam brackets 26b and 26e separated from each other in the longitudinal direction of control shaft 12 becomes smaller as a sufficient amount of heat is supplied by the lubricating oil with the elapse of time.

Notably, as shown in FIG. 6, the temperature of cam bracket 26e is remarkably lowered as compared to cam brackets 26a, 26c, and 26d. The reason for this is not only that cam bracket 26e is remotest from cam bracket 26b, but also that the temperature of cam bracket 26e is influenced strongly by actuator 13 having a relatively high thermal capacity.

Therefore, according to the first embodiment of the present invention, the lubricating system inclusive of the control shaft and bearings is arranged to supply the lubricating oil into hollow section 31 inside control shaft 12 through cam bracket 26e of bearing 29e nearest to actuator 13 to reduce the adverse influence of the thermal capacity of actuator 13 and to reduce the temperature nonuniformity in the longitudinal direction of control shaft 12. Thereby, control shaft 12 is warmed from the second end of control shaft 13 whose thermal capacity is increased by the adjacent actuator 13.

Figure 7:
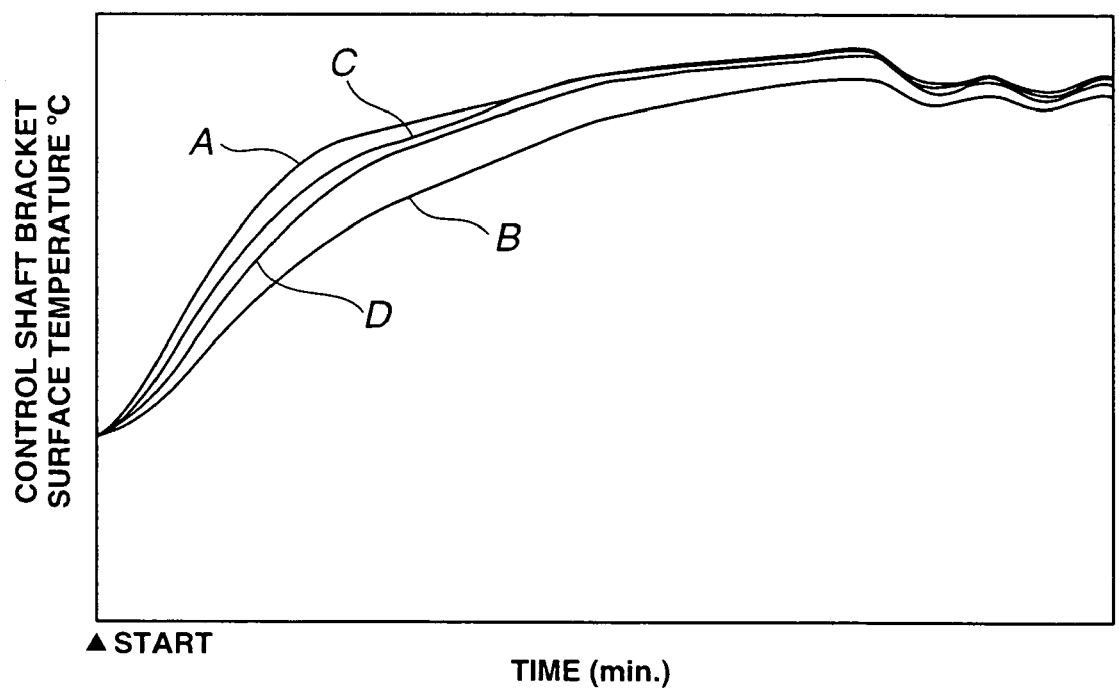
FIG. 7 is a characteristic diagram showing the result of temperature measurement of each cam bracket from an engine start to an end of warm-up in the mechanism according to the first embodiment.

Therefore, as shown in FIG. 7, the lubricating system according to the first embodiment of the present invention can increase the temperature of cam bracket 26e relatively during warm-up, and thereby reduce the temperature difference between cam brackets 26b and 26e. That is, the lubricating system can prevent nonuniformity of thermal expansion in the longitudinal direction of control shaft 12 by reducing the nonuniformity in temperature distribution in the longitudinal direction of the control shaft. Therefore, this arrangement reduces variations in temperature of control shaft 12 in the longitudinal direction, reduces variations in intake valve lift quantity among cylinders, and reduces variation in torque of the internal combustion engine.

A characteristic line A in FIG. 7 shows the surface temperature of cam bracket 26b in the comparative example. A characteristic line B shows the surface temperature of cam bracket 26e in the comparative example. A characteristic line C shows the surface temperature of cam bracket 26b in the first embodiment. A characteristic line D shows the surface temperature of cam bracket 26e in the first embodiment. Temperature measurement of cam brackets 26b and 26e of the first embodiment was achieved by thermocouple of wire.

In the first embodiment of the present invention, the lubricating oil is supplied to hollow section 31 through cam bracket 26e nearest to actuator 13. However, it is optional to employ the arrangement in which the lubricating oil is supplied to hollow section 31 through the second closest bearing 26d relatively close to actuator 13, and the lubricating oil is supplied from hollow section 31 to the sliding parts between bearings 26a–26c and 26e and control shaft 12.

The lubricating system may be so arranged that the lubricating oil is supplied into hollow section 31 of control shaft 12 through two of more bearings 29, so as to supply a larger amount of the lubricating oil into a portion of hollow section in control shaft 12 near the second end. In this case, each of the cam brackets 26 of the bearings 29 through which the lubricating oil is supplied into control shaft 12 is formed with oil hole 32 for supplying the lubricating oil into hollow section 31 in control shaft 12. In this arrangement, the supply of lubricating oil is increased on a side closer to actuator 13, and therefore, control shaft 12 is warmed from the second end connected with actuator 13, so that the temperature nonuniformity is reduced in the longitudinal direction of control shaft 12. In this case, it is possible to differentiate the sizes of the oil holes 32 formed in two or more bearings 29 so that the supply of the lubricating oil into hollow section is increased in the portion closer to actuator 13, or to increase the size of oil hole 32 of bearing closer to actuator 13. Alternatively, it is possible to increase the number of oil holes 32 formed in bearing 29 closer to actuator 13.

Figure 8:
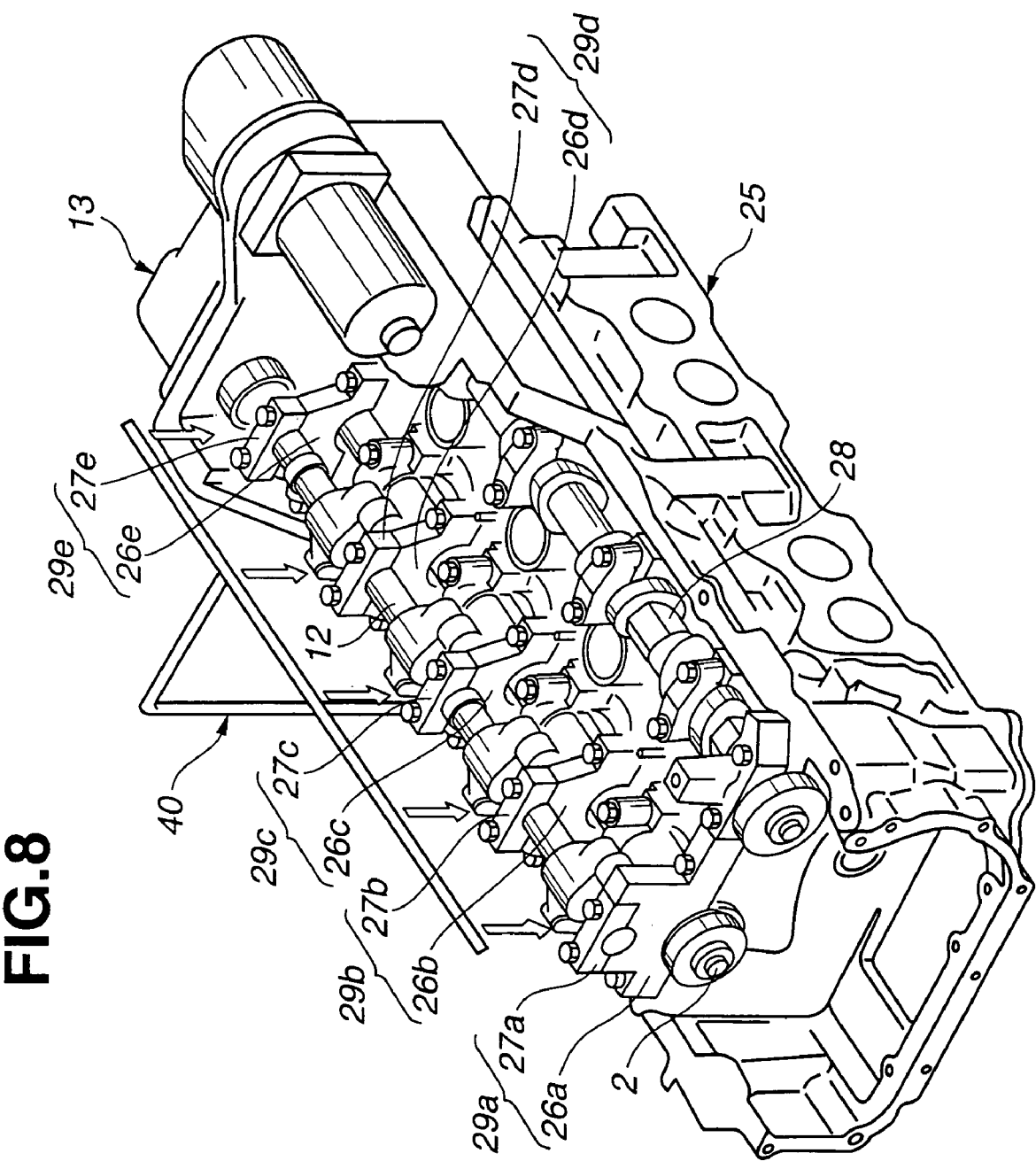
FIG. 8 is a schematic view showing an internal combustion engine provided with a variable valve actuating system or apparatus according to a second embodiment of the present invention.

FIG. 8 shows a variable valve actuating system of an internal combustion engine according to a second embodiment of the present invention. In addition to the lubricating system of the first embodiment as mentioned above, the variable valve actuating system according to the second embodiment includes an external lubricating system for supplying the lubricating oil onto the outer surface of control shaft 12 from the outside. In this example, the external lubricating system includes a lubricating oil supply pipe system 40 arranged, as a lubricating oil supply mechanism, to supply the lubricating oil to the outer surface of control shaft 12. Arrows in FIG. 8 show spray or drop directions of the lubricating oil.

In this example, the lubricating oil is supplied into hollow section 31 inside control shaft 12 through bearing 29e nearest to actuator 13, and additionally the lubricating oil is supplied to bearings 29a–29e by the lubricating oil supply pipe system spraying or dropping the lubricating oil on the outer surface of control shaft 12.

The lubricating oil supply piping 40 is connected with an oil passage (not shown) inside the internal combustion engine, and includes five outlet openings located just above five bearings 29, respectively, to spray or drop the lubricating oil approximately in equal amounts toward bearings 29.

In the second embodiment, the temperature of lubricating oil from lubricating oil supply pipe system 40 is not influenced by actuator 13, the temperature of bearing 29e nearest to actuator 13 can be further increased relatively. Thereby, this arrangement can further reduce the temperature unevenness of control shaft 12 in the longitudinal direction, further reduce variations in intake valve lift quantity among cylinders, and reduce variation in torque of the internal combustion engine.

Figure 9:
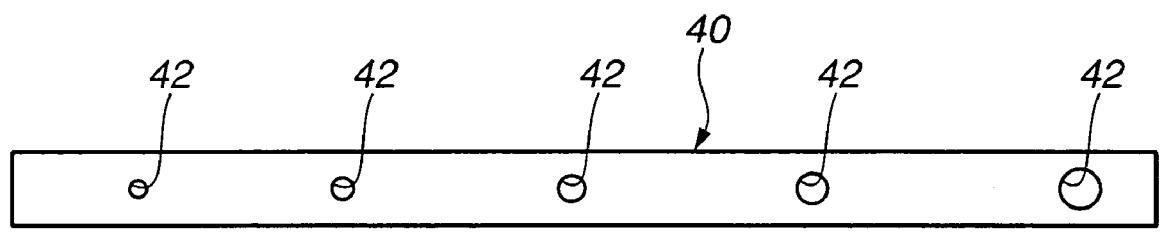
FIG. 9 is a schematic view showing a lubricating oil supply device or mechanism according to a third embodiment of the present invention.

FIG. 9 shows one practical example according to a third embodiment of the present invention. In the third embodiment, lubricating oil supply pipe 40 is arranged to differentiate the amounts of the lubricating oil supplied to five bearings 29 in accordance with the location of the bearing 29 through which the lubricating oil is supplied into hollow section 31 of control shaft 12, that is, the location of cam bracket 26 formed with oil hole 32.

When bearing 29 with oil hole 32 is located at a position nearer to actuator 13 between the second end and the middle of control shaft 12, for reason of structure and design, the lubricating oil supply pipe system 40 is arranged to decrease the supply of lubricating oil to a portion closer to actuator 13, and increase the supply of lubricating oil to a portion remoter from actuator 13. This arrangement reduces temperature unevenness of control shaft 12 in the longitudinal direction, reduces variations in intake valve lift quantity among cylinders, and reduces variation in torque of internal combustion engine.

When bearing 29 with oil hole 32 is located at a position farther away from actuator 13, between the first end and the middle of control shaft 12, the lubricating oil supply pipe system 40 is arranged to supply a larger amount of the lubricating oil to the second end portion of control shaft closer to actuator 13, and to supply a smaller amount of the lubricating oil to the first end portion remoter from actuator 13.

FIG. 9 shows one practical example of lubricating oil supply system 40 according to the third embodiment. The oil supply pipe system 40 includes a longitudinal pipe extending along controls shaft 12 above control shaft 12, and the longitudinal pipe is formed with a plurality of outlet holes 42 for directing the lubricating oil to bearings 29, respectively. In this example, outlet holes 42 are not equal in size or diameter. The opening sizes of outlet holes 42 are so determined as to uniformize the temperature of control shaft 12 in the longitudinal direction. Alternatively, it is possible to employ a lubricating oil supply pipe system 45 shown in FIG. 10.

In lubricating oil supply system 40 shown in FIG. 9, the diameters of circular outlet holes 42 are increased in a stepwise manner from the left end to the right end of the pipe, so as to increase the amount of discharged lubricating oil from the left side to the right side.

Figure 10:
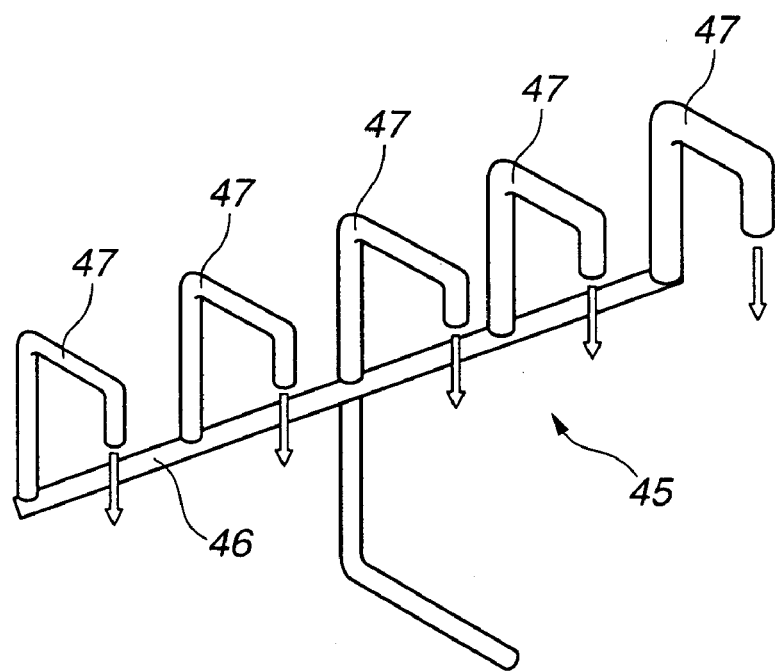
FIG. 10 is a schematic view showing a lubricating oil supply device or mechanism in another practical example according to the third embodiment.

In FIG. 10, arrows show spray or drop directions of the lubricating oil. Lubricating oil supply pipe system 45 of FIG. 10 includes a base pipe segment 46 communicating with an oil passage inside internal combustion engine, and extending along control shaft 12; and outlet branch segments 47 extending from base segments 46, respectively, toward bearings 29 from above. The opening sizes or inside diameter of outlet branches 47 are changed stepwise from the left side to the right so as to increase the amount of lubricating oil toward the right.

When there are employed both of the internal lubricating system utilizing hollow section 31 of control shaft 12 and the external lubricating system utilizing pipe system 40 or 45 as in the second and third embodiments, it is possible to regulate the temperature distribution of control shaft 12 along the longitudinal direction in various manners by utilizing either or both of the internal and external lubricating systems, without limitation to the manners of the second and third embodiments.

The system according to each embodiment mentioned above is designed to minimize the temperature nonuniformity in control shaft 12 in the longitudinal direction by using the lubricating oil for bearings 29 supporting control shaft 12 rotatably. Therefore, when actuator 13 connected with the second end of control shaft 12 has a very large thermal capacity, it is possible to attain the intended purpose by supplying the lubricating oil into control shaft 12 from a position near the second end of control shaft 12 between the second end and middle of the control shaft, and at the same time by spraying or dropping the lubricating oil to the outer surface of control shaft 12 in such an unequal manner as to increase the amount of oil near the second end and to decrease the amount of oil near the first end of control shaft 12.

When actuator 13 has a relatively small thermal capacity, it is possible to attain the intended purpose by supplying the lubricating oil into hollow section 31 at a middle portion of control shaft 12 between the first and second ends, and by supplying the lubricating oil to the outer surface of control shaft 12 evenly in the longitudinal direction of control shaft 12 with the lubricating oil supply pipe system 40 or 45.

In still another example, the lubricating oil is supplied into hollow section 31 at a middle portion in the longitudinal direction of the control shaft 12, and the lubricating oil is further supplied to the outer surface of control shaft 12 with the lubricating oil supply pipe system so as to increase the supply quantity near the second end of control shaft 12, as compared to the supply to a first end portion near the first end of control shaft 12.

Furthermore, it is optional to employ the external lubricating system only, without employing the internal lubricating system utilizing hollow section 31 of control shaft 12 as a lubricant passage. In this case, the lubricating oil is supplied to bearings 29 only by the lubricating oil supply pipe system 40 or 45 arranged to spray or drop the lubricating oil on the outer surface of control shaft 12, so as to make uniform the temperature of control shaft 12 in the longitudinal direction. In this case, control shaft 12 need not be a hollow shaft, but control shaft may be a solid shaft with no inside hollow section.

This application is based on a prior Japanese Patent Application No. 2003-409753. The entire contents of the Japanese Patent Application No. 2003-409753 with a filing date of Dec. 9, 2003 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A variable valve actuating apparatus for an internal combustion engine, comprising:
    a lift and operating angle varying mechanism which includes a control shaft extending in a longitudinal direction from a first end to a second end along a cylinder row of the engine, and which is arranged to vary an intake valve operation angle and an intake valve lift of the engine continuously by rotating the control shaft;
    an actuator disposed at the second end of the control shaft, and arranged to rotate the control shaft; and
    a plurality of bearings supporting rotatably the control shaft;
    the control shaft being a hollow shaft including a hollow section extending inside the control shaft in the longitudinal direction, and adapted to receive supply of lubricating oil to lubricate the bearings.

2. The variable valve actuating apparatus as claimed in claim 1, wherein one of the bearings is an inlet side bearing arranged to supply the lubricating oil into the hollow section.

3. The variable valve actuating apparatus as claimed in claim 2, wherein the inlet side bearing is located near the second end of the control shaft.

4. The variable valve actuating apparatus as claimed in claim 2, wherein the inlet side bearing is closest to the second end of the control shaft among the bearings.

5. The variable valve actuating apparatus as claimed in claim 2, wherein the inlet side bearing is formed with an oil hole to supply the lubricating oil into the hollow section of the control shaft.

6. The variable valve actuating apparatus as claimed in claim 5, wherein another of the bearings is an outlet side bearing arranged to receive the lubricating oil from the hollow section of the control shaft, and formed with no oil hole.

7. The variable valve actuating apparatus as claimed in claim 1, wherein the control, shaft is formed with a plurality of holes each arranged to allow the lubricating oil to flow between the hollow section and one of the bearings.

8. The variable valve actuating apparatus as claimed in claim 1, wherein the control shaft is arranged to receive the supply of the lubricating oil so that the supply of the lubricating oil into the hollow section is greater in a portion close to the second end to which the actuator is connected, than in a portion remote from the second end.

9. The variable valve actuating apparatus as claimed in claim 8, wherein the control shaft is arranged to receive the supply of the lubricating oil at two separate points separated from each other in the longitudinal direction of the control shaft.

10. The variable valve actuating apparatus as claimed in claim 1, the variable valve actuating apparatus further comprises a lubricating oil supply device to supply the lubricating oil to the bearings by discharging the lubricating oil onto an outer surface of the control shaft.

11. The variable valve actuating apparatus as claimed in claim 10, wherein the lubricating oil supply device is arranged to discharge the lubricating oil to the control shaft evenly in the longitudinal direction of the control shaft, and the control shaft is arranged to receive the supply of the lubricating oil at a position closer to the second end of the control shaft than to the first end.

12. The variable valve actuating apparatus as claimed in claim 10, wherein the lubricating oil supply device is arranged to discharge the lubricating oil to the control shaft unevenly in the longitudinal direction of the control shaft so that the supply of the lubricating oil to the outer surface of the control shaft is increased toward the second end of the control shaft, and the control shaft is arranged to receive the supply of the lubricating oil into the hollow section at a middle position between the first and second ends of the control shaft.

13. The variable valve actuating apparatus as claimed in claim 10, wherein the lubricating oil supply device includes a plurality of oil outlets each to discharge the lubricating oil toward a unique one of the bearings.

14. The variable valve actuating apparatus as claimed in claim 13, wherein the oil outlets are nonuniformly sized so that the supply of the lubricating oil is increased toward the second end of the control shaft.

15. The variable valve actuating apparatus as claimed in claim 1, wherein the lift and operating angle varying mechanism further comprises a cam drive shaft extending along the control shaft, a valve operating cam mounted rotatably on the cam drive shaft and arranged to operate an engine intake valve, and a link mechanism to transmit motion from the cam drive shaft through the control shaft to the valve operating cam.

16. A variable valve actuating apparatus for an internal combustion engine comprising:
   a lift and operating angle varying mechanism which includes a control shaft extending from a first end to a second end in a longitudinal direction along a cylinder row of the engine, and which is arranged to vary an intake valve operation angle and an intake valve lift of the engine continuously by rotating the control shaft;
   an actuator disposed at the second end of the control shaft, and arranged to rotate the control shaft;
   a plurality of bearings supporting rotatably the control shaft; and
   a lubricating oil supply device to supply a lubricating oil to the bearings by discharging the lubricating oil onto an outer surface of the control shaft;
   wherein the lubricating oil supply device is arranged to spray or drop the lubricating oil to the control shaft unevenly in the longitudinal direction of the control shaft so that the supply of the lubricating oil to the outer surface of the control shaft is increased toward the second end of the control shaft.

17. A variable valve actuating apparatus for an internal combustion engine comprising:
   a lift and operating angle varying mechanism which includes a control shaft extending in a longitudinal direction from a first end to a second end along a cylinder row of the engine, and which is arranged to vary an intake valve operation angle and an intake valve lift of the engine continuously by rotating the control shaft;
   a plurality of bearings supporting rotatably the control shaft; and
   means for supplying a lubricating oil to the bearings so as to reduce nonuniformity in temperature distribution of the control shaft in the longitudinal direction.

18. The variable valve actuating apparatus as claimed in claim 17, wherein the lubricating oil supplying means includes means for supplying the lubricating oil to the bearings through an inside hollow section in the control shaft.

19. The variable valve actuating apparatus as claimed in claim 17, wherein the lubricating oil supplying means includes means for supplying the lubricating oil onto an outer surface of the control shaft.

* * * * *